United States Patent
Alves Dos Santos et al.

(10) Patent No.: US 12,030,816 B2
(45) Date of Patent: Jul. 9, 2024

(54) MINERAL BINDER COMPOSITIONS WITH ACCELERATED SETTING AND/OR CURING

(71) Applicant: SIKA TECHNOLOGY AG, Baar (CH)

(72) Inventors: Flaviane Alves Dos Santos, Hoboken, NJ (US); Mohamed Cader, Cranford, NJ (US); Andrea Lucero, Rutherford, NJ (US)

(73) Assignee: SIKA TECHNOLOGY AG, Baar (CH)

( * ) Notice: Subject to any disclaimer, the term of this patent is extended or adjusted under 35 U.S.C. 154(b) by 335 days.

(21) Appl. No.: 17/603,703

(22) PCT Filed: Apr. 30, 2020

(86) PCT No.: PCT/EP2020/062161
§ 371 (c)(1),
(2) Date: Oct. 14, 2021

(87) PCT Pub. No.: WO2020/221909
PCT Pub. Date: Nov. 5, 2020

(65) Prior Publication Data
US 2022/0242789 A1 Aug. 4, 2022

(30) Foreign Application Priority Data
May 2, 2019 (EP) .................................... 19172266

(51) Int. Cl.
| | | |
|---|---|---|
| C04B 28/16 | (2006.01) | |
| C04B 14/06 | (2006.01) | |
| C04B 14/28 | (2006.01) | |
| C04B 22/14 | (2006.01) | |
| C04B 24/12 | (2006.01) | |
| C04B 24/26 | (2006.01) | |
| C04B 28/04 | (2006.01) | |
| C04B 103/10 | (2006.01) | |
| C04B 111/00 | (2006.01) | |
| C04B 111/27 | (2006.01) | |
| C04B 111/28 | (2006.01) | |
| C04B 111/62 | (2006.01) | |
| C04B 111/70 | (2006.01) | |
| C04B 111/72 | (2006.01) | |

(52) U.S. Cl.
CPC .............. *C04B 28/16* (2013.01); *C04B 14/06* (2013.01); *C04B 14/28* (2013.01); *C04B 22/147* (2013.01); *C04B 24/122* (2013.01); *C04B 24/2647* (2013.01); *C04B 28/04* (2013.01); *C04B 2103/10* (2013.01); *C04B 2111/00637* (2013.01); *C04B 2111/27* (2013.01); *C04B 2111/28* (2013.01); *C04B 2111/62* (2013.01); *C04B 2111/70* (2013.01); *C04B 2111/72* (2013.01)

(58) Field of Classification Search
CPC ......... C04B 28/16; C04B 14/06; C04B 14/28; C04B 22/147; C04B 24/122; C04B 24/2647; C04B 28/04; C04B 28/06; C04B 28/065; C04B 2103/10; C04B 2111/00637; C04B 2111/27; C04B 2111/28; C04B 2111/62; C04B 2111/70; C04B 2111/72; C04B 2111/76; C04B 2111/766
See application file for complete search history.

(56) References Cited

FOREIGN PATENT DOCUMENTS

| | | | |
|---|---|---|---|
| CN | 101 386 482 A | | 3/2009 |
| CN | 102 936 114 A | | 2/2013 |
| CN | 102936114 A | * | 2/2013 |
| CN | 103242018 A | * | 8/2013 |
| CN | 103 342 528 A | | 10/2013 |
| CN | 102729326 B | * | 10/2014 |
| CN | 104478364 A | * | 4/2015 |
| CN | 106830977 A | * | 6/2017 |
| DE | 738394 C | | 8/1943 |
| DE | 253992 A1 | | 2/1988 |
| GB | 1 460 284 A | | 12/1976 |
| WO | 2009/077591 A2 | | 6/2009 |

OTHER PUBLICATIONS

Jul. 17, 2020 Written Opinion of the International Searching Authority issued in International Patent Application No. PCT/EP2020/062161.
Jul. 17, 2020 International Search Report issued in International Patent Application No. PCT/EP2020/062161.

* cited by examiner

*Primary Examiner* — Anthony J Green
(74) *Attorney, Agent, or Firm* — Oliff PLC

(57) ABSTRACT

Mineral binder compositions with accelerated setting and/or curing including a mineral binder, at least one free-radical initiator, and at least one catalyst for the at least one free-radical initiator. The mineral binder compositions accelerated setting and hardening and are especially useful for applications at low temperatures and even below 0° C.

12 Claims, No Drawings

MINERAL BINDER COMPOSITIONS WITH ACCELERATED SETTING AND/OR CURING

TECHNICAL FIELD

The invention relates to mineral binder compositions with accelerated setting and/or curing, especially at low temperatures. Furthermore, the invention relates to the use of a combination of free-radical initiator and catalyst for said free-radical initiator to accelerate the setting and/or curing of mineral binder compositions.

BACKGROUND OF THE INVENTION

Mineral binder compositions, in particular cementitious binder compositions, which cure by the hydraulic reaction of mineral binders with water, are significantly retarded when mixed and/or placed at low temperatures. This can lead to prolonged setting time and slow curing, especially a slow built-up of compressive strength, which in turn may lead to longer waiting periods before further work or release for use can be done. In particularly unfavorable cases mineral binder compositions do not set and cure at all. Most cementitious binder compositions require temperatures above 5° C. during mixing and placing for proper development of properties. As temperatures in different climate zones can drop well below 5° C. for significant periods of time during the year measures such as tempering of raw materials, heating of job sites, or accelerating the hydraulic reaction of mineral binders, need to be taken. Especially the tempering of raw materials or the heating of job sites can be difficult, expensive or even impossible at a given job site.

Different curing accelerators for mineral binder compositions are thus known. They are for example based on aluminates, alkanolamines, halides, nitrites, nitrates, thiocyanates, glycols, glycerol or α-hydroxycarboxylic acids. Although such known accelerators can be quite effective, they frequently have the disadvantage that they are expensive, are problematic with regard to environment, health and safety, have a potential for corrosion of steel reinforcements, and sometimes have a strongly negative influence on the workability, processing time and the final strengths of mineral binder compositions. Additionally, many accelerators are only effective at temperatures above 15° C.

Another approach is the generation of heat by a chemical reaction or a physical process to temper and/or accelerate a mineral binder composition. It is in particular possible to incorporate reactants for an exothermic chemical reaction into the mineral binder composition.

GB 1460284 (W. Lieber) discloses the use the heat released during carbonation of a cementitious mixture by gaseous $CO_2$. The problem is that a $CO_2$ rich atmosphere is needed which cannot be realized on a construction site.

DE 738394 (Heidelberg Zement AG) discloses the use of finely divided slaked lime in a cementitious mixture to generate heat upon mixing with water. However, the setting time of such mixtures can be very fast and thus workability can be limited.

DD 253992 (Orgreb-Institut) finally discloses a method for rapid hardening of mortars at low temperatures by application of an electrical heating voltage. Due to the difficult installation of suitable equipment on a job site this method is not suitable in most practical applications.

WO 2009/077591 (Sika Technology AG, Tricosal GmbH & Co KG) discloses a multi-component composition for crack filling comprising a cementitious binder, at least one radically polymerizable monomer and initiator systems for said radically polymerizable monomer. The use of the initiator systems alone, especially as accelerators, is not disclosed.

There is thus a need for improved mineral binder compositions which are easy to use on job sites, which have good workability and final strength, and which show an accelerated setting and/or curing especially at low temperatures.

DESCRIPTION OF THE INVENTION

It is an objective of the present invention to provide mineral binder compositions with accelerated setting and/or curing, preferably at temperatures <15° C., more preferably <5° C., especially <0° C. It is a further object of the present invention to provide accelerators useful to accelerate mineral binder compositions, preferably at temperatures <15° C., more preferably <5° C., especially <0° C.

It has surprisingly been found that the objectives of the present invention can be achieved by the use of a combination of at least one free-radical initiator I and at least one catalyst C in a mineral binder composition as claimed in claim 1.

The present invention therefore relates to a mineral binder composition comprising
a) a mineral binder B,
b) at least one free-radical initiator I,
c) at least one catalyst C for the at least one free-radical initiator I,
d) optionally aggregates,
e) optionally further additives selected from the groups of plasticizers, superplasticizers, rheology modifiers, accelerators, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, anti-freeze agents, and/or anti-microbial agents,
wherein the composition is essentially free of radically polymerizable monomers or polyisocyanates.

It has been found that the inventive use of a combination of at least one free-radical initiator I and at least one catalyst C for said at least one free-radical initiator I leads to a significant decrease in setting time of a mineral binder B or a mineral binder composition based on said mineral binder B when mixed with water as compared to the same mineral binder B or mineral binder composition without free-radical initiator I and catalyst C, in particular at temperatures <15° C., preferably <5° C., especially <0° C.

It has further been found that the inventive use of a combination of at least one free-radical initiator I and at least one catalyst C for said at least one free-radical initiator I leads to a significant increase in compressive strength when measured 24 h after the addition of mixing water to a mineral binder composition when compared to the same mineral binder composition without free-radical initiator I and catalyst C.

Especially, said accelerated mineral binder compositions show an accelerated setting and/or curing when mixed with water and placed at temperatures between +30° C. and −15° C., preferably between +25° C. and −10° C., especially between +15° C. and −5° C.

It is a further advantage of a mineral binder composition of the present invention that the accelerating effect can be fine-tuned by the dosage of the at least one free-radical initiator I and at least one catalyst C, especially according to the type of mineral binder B used. The accelerating effect can likewise be fine-tuned by the dosage of the at least one free-radical initiator I and at least one catalyst C according to the envisaged temperature during application. A higher dosage of the at least one free-radical initiator I and at least one catalyst C generally leads to a faster reaction.

Without wishing to be bound by theory it is assumed that the effect of the at least one free-radical initiator I and the at least one catalyst C for said initiator I is the release of heat during generation of radicals which in turn provides energy for the hydration reactions.

Mineral binder compositions of the present invention can be used in a variety of applications. They can, for example, be used as concrete, repair mortar, grout, screed, putty, tile adhesive, levelling compound, render, underlayment, overlayment, sealing slurry, water plug, cementitious industrial floor, cementitious waterproofing membrane, or fireproofing mortar.

Further aspects of the invention are subject matter of further independent claims. Particularly preferred embodiments of the invention are subject matter of the dependent claims.

WAYS OF CARRYING OUT THE INVENTION

For the present purpose the term "accelerator" stands for a substance or mixture of substances that influences the hydraulic reaction of mineral binders with water so that the setting and/or curing of mineral binder compositions becomes faster. In particular an accelerator leads to an increase in initial and/or final setting time, preferably initial and final setting time. Likewise, an accelerator leads to a higher compressive strength of a mineral binder composition comprising said accelerator after a defined point in time after mixing with water as compared to a reference without accelerator added. Alternatively, an accelerator can lead to the same initial and final setting time as well as the same compressive strength of the mineral binder composition after a defined point in time after mixing with water as compared to a reference without accelerator added if mixing and/or curing of said mineral binder compositions comprising an accelerator takes place at lower temperature compared to said reference.

The expression "mineral binder" refers in the context of the present invention to a binder, which in the presence of water reacts in a hydration reaction to form solid hydrates or hydrate phases. This can be, for example, a hydraulic binder (e.g. cement or hydraulic lime), a latent hydraulic binder (e.g. slag), a pozzolanic binder (e.g. fly ash) or a nonhydraulic binder (gypsum plaster or white lime). A "mineral binder composition" is accordingly a composition comprising at least one mineral binder.

It was surprisingly found that a combination of a mineral binder B with the at least one free-radical initiator I and the at least one catalyst C for said at least one free-radical initiator I leads to an acceleration of setting and/or curing of the corresponding mineral binder composition upon the addition of water also at temperatures <15° C. and as low as −15° C. By combining the mineral binder B with at least one free-radical initiator I and at least one catalyst C a significant reduction in initial as well as final setting time is achieved when a mineral binder composition comprising B, I, and C is compared to the same mineral binder composition without I and C. Setting time can be measured according to ASTM C403 using a penetrometer.

Said reduction in initial as well as final setting time is measurable when temperatures of materials used as well as surroundings are between +30° C. and −15° C., preferably between +25° C. and −10° C., especially between +15° C. and −5° C.

It was surprisingly further found that a combination of a mineral binder B with the at least one free-radical initiator I and the at least one catalyst C for said at least one free-radical initiator I leads to an increase in early compressive strength, especially compressive strength after curing for 24 h after the addition of water when compared to the same mineral binder or mineral binder composition without catalyst C and free-radical initiator I added. Compressive strength can be measured in accordance with standard ASTM C-109.

Another advantage of the mineral binder composition of the present invention is that other important properties remain unchanged. Especially, workability, shrinkage, and final compressive strength of mineral binder compositions comprising B, I, and C remain practically unchanged to the same mineral binder composition without I and C.

In a first aspect, the present invention therefore relates to a mineral binder composition comprising
  a) a mineral binder B,
  b) at least one free-radical initiator I,
  c) at least one catalyst C for the at least one free-radical initiator I,
  d) optionally aggregates,
  e) optionally further additives selected from the groups of plasticizers, superplasticizers, rheology modifiers, accelerators, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, antifreeze agents, and/or anti-microbial agents,
whereas the composition is essentially free of radically polymerizable monomers or polyisocyanates.

The mineral binder composition is essentially free of radically polymerizable monomers or polyisocyanates. Essentially free means, within the context of the present invention, that the total amount of radically polymerizable monomers or polyisocyanates is <5.0 w %, preferably <4.0 w %, more preferably <1.0 w %, still more preferably <0.3 w %, especially <0.1 w %, each based on the total weight of the mineral binder composition.

Radically polymerizable monomers are known per se to the person skilled in the art. Examples for radically polymerizable monomers are vinylesters, (meth)acrylic acid and their salts, (meth)acrylic acid esters, acrylonitrile, acrylamide, and styrene.

Polyisocyanates are known per se to the person skilled in the art. The term polyisocyanates, within the context of the present invention, comprises all polymers which are obtainable by diisocyanate-polyaddition process. Examples for polyisocyanates are polyether-polyurethane, polyester-polyurethane, polyether-polyurea, polyurea, polyester-polyurea, polyisocyanurate, and polycarbodiimide.

According to embodiments, the mineral binder B comprises one or more hydraulic binders, preferably cements. Particular preference is given to cements having a cement clinker content of 35% by weight. According to embodiments, the one or more cement is of the type CEM I, II, III, IV or V according to the standard EN 197-1. According to further embodiments, the cement is a calcium aluminate cement according to the standard EN 14647:2006-01. According to still further embodiments, the cement is a calcium sulfoaluminate cement. According to still further embodiments, the mineral binder B comprises mixtures of two or more hydraulic binders, preferably cements. A proportion of the one or more hydraulic binders, preferably cements, in the total mineral binder B is advantageously at least 5 w %, in particular at least 20 w %, preferably at least 35 w %, each based on the total dry weight of the mineral binder B. In a further advantageous embodiment, the mineral binder B consists to an extent of at least 95% by weight of the one or more hydraulic binders, in particular cement clinker.

One particular advantageous combination of hydraulic binders for a mineral binder B is the combination of at least two cements of type CEM I, II, III, IV or V. Another particular advantageous combination of hydraulic binders for a mineral binder B is the combination of at least one cement of type CEM I, II, III, IV or V with at least one calcium sulfoaluminate cement. Another particular advantageous combination of hydraulic binders for a mineral binder B is the combination of at least one cement of type CEM I, II, III, IV or V with at least one calcium aluminate cement.

However, it can also be advantageous for the mineral binder B to comprise other binders in addition to or instead of a hydraulic binder. These are, in particular, latent hydraulic binders and/or pozzolanic binders. Suitable latent hydraulic and/or pozzolanic binders are, for example, slag, fly ash and/or silica dust. In an advantageous embodiment, the mineral binder B comprises 5-95 w %, in particular 5-65 w %, especially 15-35 w %, each based on the dry weight of the mineral binder B, of latent hydraulic and/or pozzolanic binders.

It can further be advantageous for the mineral binder B to comprise additional calciumsulfate. Calciumsulfate can be present in form of anhydrite, dihydrate, hemihydrate or mixtures thereof. The hemihydrate of calciumsulfate is most preferred. The mineral binder B may comprise up to 40 w %, preferably up to 35 w %, especially up to 20 w %, each based on the dry weight of the mineral binder B, of a calciumsulfate.

Preferably, the mineral binder B is present in the mineral binder composition of the present invention in an amount of 10-75 w %, more preferably 15-66 w %, even more preferably 20-50 w %, especially 25-45 w % each based on the total dry weight of the mineral binder composition.

Preferably, the mineral binder B has a regular fineness. This means that the mineral binder B, especially any cements comprised in the mineral binder B, are not extra fine or super fine materials. According to embodiments, the mineral binder B, especially any cements comprised in the mineral binder B, has a Blaine surface of not more than 6'000 cm$^2$/g, preferably not more than 5'000 cm$^2$/g, more preferably not more than 4'500 cm$^2$/g, especially not more than 4'000 cm$^2$/g. The Blaine surface can be measured according to standard ASTM C204-18e1.

The at least one free-radical initiator I comprised in the mineral binder composition of the present invention can be any free-radical initiator known to those skilled in the art.

The at least one free-radical initiator I is selected from the groups of azo-compounds, persulfates, peroxodisulfates, salts of hydroxymethanesulfinic acid, hydroperoxides, peracetates, acylated phosphines, phospinoxides, and organic peroxides or from any other material, which is known to the skilled person for being capable to generate radicals.

The at least one free-radical initiator I can be present in any form such as, for example, solid powder, paste or liquid. According to certain embodiments, the at least one free-radical initiator I is present in powder form which is especially suitable in cases where the at least one radical-initiator I is premixed with a mineral binder B to form a dry mix, which does not contain water and which can be stored and transported.

It is, however, also possible for the at least one free-radical initiator I to be present in liquid form or as a dispersion or solution in water.

According to embodiments, the at least one free-radical initiator I has a solubility of at least 0.1 g/100 g water, preferably of at least 0.5 g/100 g water at a temperature of 20° C.

The at least one free-radical initiator I is preferably selected from the group consisting of azobis(isobutyronitrile), 2,2'-azobis(2-methylpropionamidine), 1,1'-azobis(cyclohexanecarbonitrile), 4,4'-azobis(4-cyanovaleric acid), persulfates of ammonium, sodium, and/or potassium, hydrogen peroxide, tert-butyl hydroperoxide, tert-butyl peracetate, cumene hydroperoxide, dicumyl peroxide, 2,5-di(tert-butylperoxy)-2,5-dimethyl-3-hexyne, 2,5-di(tert-butylperoxy)-2,5-dimethylhexane, 2,4-pentandione peroxide, bis-(tert-butylperoxy)cyclohexane, bis-(tert-amylperoxy)cyclohexane, 2-butanonperoxide, dibenzoylperoxide, di-(tert-butyl)peroxide, lauroyl peroxide, tert-butyl peroxybenzoate, di-(2-ethylhexyl)-peroxydicarbonate, tert-butylperoxy-2-ethylhexyl carbonate, methylethylketoneperoxide, and mixtures thereof.

According to especially preferred embodiments, the at least one free-radical initiator I is selected from the group consisting of azobis(isobutyronitrile), hydrogen peroxide, dibenzoylperoxide, and sodium persulfate.

Preferably, the at least one free-radical initiator I is present in the mineral binder composition in an amount of 0.01-10.0 w %, more preferably 0.05-5.0 w %, even more preferably 0.1-2.5 w %, most preferably 0.2-1.0 w %, each based on the total dry weight of the mineral binder composition.

It is, of course, possible to use a mixture of two or more free-radical initiators I in a mineral binder composition of the present invention.

The at least one catalyst C for the at least one free-radical initiator I serves to promote the generation of free radicals. Such catalysts are known to those skilled in the art.

The at least one catalyst C for the at least one free-radical initiator I is preferably selected from the group consisting of ascorbic acid, sodium formaldehyde sulfoxylates (SFS) such as Rongalit® (commercially available from BASF), organic sulfinic acid derivatives and salts thereof such as Bruggolite® FF6 and FF7 (commercially available from Bruggeman Chemical), toluidine derivatives, transition metal salts or transition metal complexes, especially of iron, cobaldt, nickel, copper, manganese or vanadium, for example manganese octoate, inorganic sulfur bearing salts, for example iron sulfinate, a reducing sugar such as glucose, alkylaminoalkyl(meth)acrylamides, alkylaminoalkyl(meth)acrylates, secondary and tertiary amines, especially alkanolamines, ethoxylated alkanolamines, substituted anilines, substituted toluidines, substituted xylidines, or substituted morpholines, and mixtures thereof.

According to embodiments, the at least one catalyst C for the at least one free-radical initiator I is selected to be reactive with the at least one free-radical initiator I. This means, that the at least one catalyst C is selected to catalyse the free-radical formation by the specific free-radical initiator I.

According to a preferred embodiment, the at least one catalyst C is thus selected from substituted anilines, substituted toluidines, and/or substituted xylidines and the at least one free-radical initiator I is selected from hydrogen peroxide, tert-butyl hydroperoxide, cumene hydroperoxide, dicumyl peroxide, dibenzoylperoxide, di-(tert-butyl)peroxide, and/or tert-butyl peroxybenzoate.

According to another preferred embodiment, the at least one catalyst C is thus selected from alkanolamines and the at least one free-radical initiator I is selected from persulfates of ammonium, sodium, and/or potassium.

Suitable alkanolamines for use as the at least one catalyst C include monoalkanol, dialkanol and trialkanol amines, preferably selected from the group consisting of ethanolamine, dimethylaminoethanol, methylethanolamine, N,N-diethylethanolamine, 2-amino-2-methyl-propanol, N-butylethanolamine, N-methyldiisopropanolamine, methyldiethanolamine, diisopropanolamin, diethanolamine, triethanolamine, N-butyldiethanolamine, 2-amino-2-methyl-1,3-propandiol, N-[2-(dimethylamino)ethyl]-N-methylethanolamine, N,N,N',N'-tetrakis(2-hydroxyethyl) ehtylendiamine, and mixtures thereof.

Suitable alkylaminoalkyl(meth)acrylamides and alkylaminoalkyl(meth)acrylates for use as the at least one catalyst C include dimethylaminopropyl methacrylamide (DMAPMA) and dimethylaminoethyl methacrylate (DMAEMA).

Suitable anilines for use as the at least one catalyst C include N,N-dimethylaniline, N,N-diethylaniline, N,N-bis(hydroxyalkyl)aniline such as N,N-bis(2-hydroxyethyl)aniline and N-alkyl-N-hydroxyalkyaniline such as N-ethyl-N-hyroxyethylaniline.

Suitable toluidines for use as the at least one catalyst C include N,N-dimethyl-p-toluidine, N,N-diethyl-p-toluidine, N-methyl-N-hydroxyethyl-p-toluidine, N,N-bis(2-hydroxyethyl)-p-toluidine, N-ethoxylated p-toluidine According to preferred embodiments the at least one catalyst C is an alkanolamine, most preferably selected from the group consisting of diethanolamine (DEA), triethanolamine (TEA), N-butyldiethanolamine, 2-amino-2-methyl-1,3-propandiol, dimethylaminopropyl methacrylamide (DMAPMA), dimethylaminoethyl methacrylate (DMAEMA), 2-((2-(dimethylamino)ethyl)(methyl)amino)-1-ol, N-[2-(dimethylamino)ethyl]-N-methylethanolamine (DABCO-T), N,N,N',N'-tetrakis(2-hydroxyethyl)ehtylendiamine (THEED), and mixtures thereof.

According to one or more embodiments, the at least one catalyst C is present in the mineral binder composition in an amount of 0.05-10.0 w %, more preferably 0.1-7.5 w %, even more preferably 0.25-5.0 w %, especially 0.5-3.5 w %, each based on the total dry weight of the mineral binder composition.

It is, of course, possible and in certain cases also preferred to use a mixture of two or more catalysts C for the at least one free-radical initiator I.

The at least one catalyst C for the at least one free-radical initiator I can be present in any form such as, for example, solid powder, paste or liquid. According to certain embodiments, the at least one catalyst C is present in powder form which is especially suitable in cases where the at least one catalyst C is premixed with a mineral binder B to form a dry mix, which does not contain water and which can be stored and transported.

According to embodiments, the at least one catalyst C has a solubility of at least 0.1 g/100 g water, preferably of at least 0.5 g/100 g water at a temperature of 20° C.

According to embodiments, the molar ratio of the at least one free-radical initiator I to the at least one catalyst C can vary in a wide range. According to particularly preferred embodiments, the molar ratio of the at least one free-radical initiator I to the at least one catalyst C is from 50:1 to 1:100, preferably from 10:1 to 1:50, more preferably from 1:1 to 1:20, especially from 1:1 to 1:10. It is, however, also possible to use a higher or a lower molar ratio of the at least one free-radical initiator I to the at least one catalyst C.

The mineral binder composition of the present invention may additionally comprise water or can be mixed up with water. Water within the present context can be any water available at the site of mixing such as distilled water, purified water, tap water, mineral water, spring water, well water, waste water, or salt water. According to embodiments, water is added to a mineral binder composition of the present invention in an amount to yield a ratio of water to mineral binder B of between 0.1-1, preferably 0.2-0.6, especially 0.3-0.5.

The mineral binder composition of the present invention may further comprise one or more aggregate. The term "aggregate" as used in the context of the present invention refers to mineral materials that are non-reactive in the hydration reaction of cementitious binders. Aggregates can be any aggregate typically used for cementitious compositions such as concrete, mortars, screeds, renders, grouts, coatings, putties or the like. Typical aggregates are for example rock, crushed stone, e.g. crushed limestone, gravel, slag, sand, recycled concrete, perlite or vermiculite. Aggregates useful for the present invention can have any shape and size typically encountered for such aggregates. According to embodiments, a mineral binder composition of the present invention comprises 0-80 w %, preferably 10-75 w %, more preferably 25-70 w %, each based on the dry weight of the mineral binder composition, of aggregate.

According to embodiments, the mineral binder composition of the present invention comprises aggregates, preferably sand. Sand is a naturally occurring granular material composed of finely divided rock or mineral particles. It is available in various forms and sizes. Examples of suitable sand are quartz sand, limestone sand, river sand or crushed aggregates. Suitable sand are for example described in standards ASTM C778 or EN 196-1.

Preferably, at least part of the sand is quartz sand or limestone sand or a mixture thereof, especially preferred is quartz sand, since it is chemically inert, strong, available in various sizes and the workability of the composition can be set advantageously.

Commonly, sand is supplied in different fractions of grains passing through a sieve with clear openings. Preferred is sand of which at least 95 w % are smaller than 5 mm, more preferred smaller than 4 mm, even more preferred smaller than 3.5 mm. Such granulometry enables an optimized grain size distribution for homogeneous mixing, good rheology of the fresh mineral binder composition and high strength of the hardened mineral binder composition.

Preferred sand has a particle size distribution with particle sizes ranging from 0.04 to 5 mm, more preferred from 0.05 to 4 mm and even more preferred from 0.05 to 3.6 mm. Particle size of aggregates can be measured according to standard ASTM C136.

It is, however, also possible to use aggregate with a different particle size, especially a larger particle size, in a mineral binder composition of the present invention.

It can be advantageous if a composition of the present invention additionally comprises other additives for mineral binder compositions, in particular cementitious binder compositions. Such additives are selected from the groups of plasticizers, superplasticizers, rheology modifiers, accelerators, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, and/or anti-microbial agents.

According to embodiments, a superplasticizer can be added to a composition of the present invention. Superplasticizers can be any known to the person skilled in the art. Particular suitable superplasticizers can be poylcarboxylic ethers. Polycarboxylic ethers are comb polymers with a polycarboxylic backbone and polyalkylenoxide side-chains. Such polycarboxylic ethers are for example described in EP 2468696 (Sika Technology AG).

Superplasticizers, in particular polycarboxylic ethers, can be added to compositions of the present invention in 0-10 w %, preferably 0.1-8 w %, especially 0.25-7 w %, calculated as dry weight of superplasticizer, based on the total weight of said composition.

Other suitable superplasticizers include lignosulphonates, polynaphthalene sulphonates, polyamine sulphonates, vinyl copolymers and polyethyleneoxide phopsphonates. It can be preferred to add a mixture of different superplasticizers to an accelerator of the present invention. According to preferred embodiments, the superplasticizer is present as a solid powder.

According to embodiments, a synthetic organic polymer, which is different from the superplasticizers as described above, can be added to a mineral binder composition of the present invention. Synthetic polymers can be produced by radical polymerization of monomers selected form the group consisting of ethylene, propylene, butylene, isoprene, butadiene, styrene, acrylonitrile, acrylic acid, methacrylic acid, esters of acrylic acid, esters of methacrylic acid, vinylesters, vinylchloride. It is preferred that synthetic polymers are copolymers synthesized from two or more, preferably two, different monomers. The sequence of the copolymer can be alternating, blocked or random. Preferred synthetic polymers are copolymers of vinylacetate and ethylene, vinylacetate and ethylene and methylmethacrylate, vinylacetate and ethylene and vinylester, vinylacetate and ethylene and acrylic acid ester, vinylchloride and ethylene and vinyllaureate, vinylacetate and vinylveratate, acrylic ester and styrene, acrylic ester and styrene and butadiene, acrylic ester and acrylonitrile, styrene and butadiene, acrylic acid and styrene, methacrylic acid and styrene, styrene and acrylic acid ester, styrene and methacrylic acid ester.

The glass transition temperature (Tg) of said synthetic polymers can vary in a wide range. Tg of suitable synthetic polymers can be for example between −50° C. and +60° C., preferably between −45° C. and +50° C., more preferred between −25° C. and +35° C. Tg can be measured according to ISO 11358-1.

It is possible and in certain cases preferred to use mixtures of more than one of the said synthetic polymers in compositions of the present invention.

According to preferred embodiments, synthetic polymers can be used in solid form such as for example redispersible polymer powders. Such redispersible powders can be manufactured for example by spray drying of polymer dispersions as for example described in patent application EP1042391. Suitable redispersible powders are for example available from Wacker Chemie AG under the trade name Vinnapas. The use of redispersible powders of synthetic polymers is preferred for the context of the present invention.

A preferred mineral binder composition of the present invention thus comprises or consists of a) 10-75 w %, more preferably 15-66 w %, even more preferably 20-50 w %, especially 25-45 w %, of the a mineral binder B, b) 0.01-10.0 w %, more preferably 0.05-5.0 w %, even more preferably 0.1-2.5 w %, most preferably 0.2-1.0 w %, of the at least one free-radical initiator I, c) 0.05-10.0 w %, more preferably 0.1-7.5 w %, even more preferably 0.25-5.0 w %, especially 0.5-3.5 w %, of the at least one catalyst C for the at least one free-radical initiator I, d) 0-80 w %, preferably 10-75 w %, more preferably 25-70 w %, of aggregates, especially sand, e) 0-10 w % of other additives selected from the groups of plasticizers, superplasticizers, rheology modifiers, accelerators, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, antifreeze agents, and/or anti-microbial agents, each based on the total weight of the mineral binder composition and wherein the mineral binder composition is essentially free of radically polymerizable monomers or polyisocyanates.

According to particularly preferred embodiments, the molar ratio of the at least one free-radical initiator I to the at least one catalyst C is from 50:1 to 1:100, preferably from 10:1 to 1:50, more preferably from 1:1 to 1:20, especially from 1:1 to 1:10.

A particularly preferred mineral binder composition of the present invention thus comprises or consists of a) 10-75 w %, more preferably 15-66 w %, even more preferably 20-50 w %, especially 25-45 w %, of the a mineral binder B, b) 0.01-10.0 w %, more preferably 0.05-5.0 w %, even more preferably 0.1-2.5 w %, most preferably 0.2-1.0 w %, of the at least one free-radical initiator I, c) 0.05-10.0 w %, more preferably 0.1-7.5 w %, even more preferably 0.25-5.0 w %, especially 0.5-3.5 w %, of the at least one catalyst C for the at least one free-radical initiator I, d) 0-80 w %, preferably 10-75 w %, more preferably 25-70 w %, of aggregates, especially sand, e) 0-10 w % of other additives selected from the groups of plasticizers, superplasticizers, rheology modifiers, accelerators, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, antifreeze agents, and/or anti-microbial agents, each based on the total weight of the mineral binder composition and wherein the mineral binder composition is essentially free of radically polymerizable monomers or polyisocyanates, and wherein the molar ratio of the at least one free-radical initiator I to the at least one catalyst C is from 50:1 to 1:100, preferably from 10:1 to 1:50, more preferably from 1:1 to 1:20, especially from 1:1 to 1:10.

Compositions of the present invention can be used in a variety of applications. They can, for example, be used as concrete, repair mortar, grout, screed, putty, tile adhesive, levelling compound, render, underlayment, overlayment, sealing slurry, water plug, cementitious industrial floor, cementitious waterproofing membrane, or fireproofing mortar.

The mineral binder composition of the present invention can in principle be provided in one or more components in any conventional way.

It is, for example, possible to provide a mineral binder composition of the present invention as a mono-component composition. In such a case it is preferred, if the mineral binder composition of the present invention is a dry composition. Dry composition means that the composition is essentially free of water. Essentially free of water means that the water content is <5.0 w %, preferably <1.0 w %, especially <0.1 w %, each based on the total weight of the mineral binder composition. It is further preferred that the at least one free-radical initiator I and the at least one catalyst C for the at least one free-radical initiator I are provided in such a mono-component composition in way as not to react as long as no water is present.

A mineral binder composition of the present invention which is provided as a mono-component composition as described above can be mixed with water as described above. Mixing can be done by any process known to the person skilled in the art. Mixing can be continuously or batch wise. According to embodiments mixing can be done in Hobart mixers, portable concrete mixers, mixing trucks, mixing buckets, paddle mixers, jet mixers, screw mixers, or auger mixers by the use of static mixers or dynamic mixers.

It is therefore another aspect of the present invention to provide a method for producing a processable mineral binder composition comprising the step of mixing a mineral binder composition of the present invention with water.

It is, however, also possible to provide a mineral binder composition of the present invention as a two-component composition. In such a case it is preferred that the at least one free-radical initiator I and the at least one catalyst C for the at least one free-radical initiator I are not packaged in the same component in order to prevent the premature reaction of these constituents and in order to provide a storage-stable composition. The term "storage-stable composition" refers in the present document to a composition which, in particular in the absence of moisture, can be kept at 23° C. in a suitable package(s) or facility, such as a drum, a pouch or a cartridge, for example, for a period of several months up to one year or more, without suffering any service-relevant change in the application properties and/or reactivity of the composition.

According to one or more embodiments, the mineral binder composition is a two-component composition composed of a first component K1 and a second component K2, wherein the at least one free free-radical initiator I and the at least one catalyst C for the free radical formation are not present in the same component. Components K1 and K2 can independently from each other be in the form of a powder, a paste, or a liquid. In case that component K1 and/or component K2 is in form of a powder it can be preferred to further process such a powder to reduce dust formation during handling and mixing. Examples for such further processing are granulation, encapsulation, coating and/or packaging into water-soluble pouches.

It is preferred within the context of the present invention that the at least one free-radical initiator I is packaged in one component K1 together with the mineral binder B. It is further preferred within the context of the present invention that the component K1 comprising the at least one free-radical initiator I and the mineral binder B is in the form of a dry powder.

In one particularly preferred embodiment the at least one catalyst C is packaged in one component K2 together with the mixing water or part of the mixing water, preferably as a liquid solution or stable liquid dispersion of the at least one catalyst C in water. It is particularly preferred that the at least one catalyst C is completely soluble in water at temperatures between −15° C. and +35° C.

It is thus another aspect of the present invention to provide a multi-component composition essentially consisting of
a) a first component K1 comprising
  1) 10-75 w %, more preferably 15-66 w %, even more preferably 20-50 w %, especially 25-45 w %, of a mineral binder B, and
  2) 0.01-10.0 w %, more preferably 0.05-5.0 w %, even more preferably 0.1-2.5 w %, most preferably 0.2-1.0 w %, of the at least one free-radical initiator I,
b) a second component K2 comprising
  1) 0.05-10.0 w %, more preferably 0.1-7.5 w %, even more preferably 0.25-5.0 w %, especially 0.5-3.5 w %, of the at least one catalyst C for the at least one free-radical initiator I, and
  2) water,
each based on the total weight of the multi-component composition and wherein the multi-component composition comprises <5.0 w %, preferably <4.0 w %, more preferably <1.0 w %, still more preferably <0.3 w %, especially <0.1 w %, each based on the total dry weight of the mineral binder composition, of radically polymerizable monomers or polyisocyanates.

According to embodiments, the first component K1 as described above may additionally comprise aggregates, especially sand, as described above and/or other additives selected from the groups of plasticizers, superplasticizers, rheology modifiers, accelerators, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, anti-freeze agents, and/or anti-microbial agents, as described above.

According to further embodiments, the second component K2 as described above may additionally comprise other additives selected from the groups of plasticizers, superplasticizers, rheology modifiers, accelerators, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, anti-freeze agents, and/or anti-microbial agents, as described above.

The components K1 and K2 can be provided in two separate packages or in one package having two chambers that are separated from each other. Suitable two-chamber packaging formats are for example dual cartridges such as twin or coaxial cartridges as well as multi-chamber poaches or bags with adapters.

It is also possible to provide the mineral binder composition of the present invention as a three-component composition composed of a first component K'1, a second component K'2 and a third component K'3, wherein the mineral binder B is present in the first component K'1 and the at least one free-radical initiator I and the at least one catalyst C for the free radical formation are present in the second and third components K'2 and K'3, respectively. Components K'1-K'3 can independently from each other be in the form of a powder, a paste, or a liquid. In case that one or more of the components K'1-K'3 are in form of a powder it can be preferred to further process such a powder to reduce dust formation during handling and mixing. Examples for such further processing are granulation, encapsulation, coating and/or packaging into water-soluble pouches.

Any of the components K'2 and K'3 may additionally comprise water. The components K'1-K'3 can be provided in separate packages or in one package having three chambers that are separated from each other.

The components K1 and K2 of a two component system as described above or the components K'1-K'3 of a three component system as described above can be mixed by any process known to the person skilled in the art as described above.

It is therefore another aspect of the present invention to provide a method for producing a processable mineral binder composition comprising the step of mixing the components K1 and K2 of a two-component composition as described above and optionally of additional water.

According to one preferred embodiment of the present invention, one or more of the components K1 and K2 or K'1, K'2, and K'3 can be stored, handled, and/or used for mixing at temperatures <5° C., preferably <0° C., and as low as −15° C. without negative influence on the performance of the mineral binder composition.

According to an especially preferred embodiment of the present invention, the total amount of mixing water is comprised in one or more of the components K1 and K2 or K1, K'2, and K'3 which can be stored, handled, and/or used for mixing at temperatures <5° C., preferably <0° C., and as low as −15° C. without negative influence on the performance of the mineral binder composition. The advantage is that no additional tempering of mixing water is thus necessary.

The mineral binder composition may take the form, for example, of a dry composition or of a fluid or stiffened binder composition mixed up with mixing water. The mineral binder composition may also take the form of a fully cured mineral binder composition—for example, a shaped body.

An additional aspect of the present invention thus pertains to a shaped body which is obtainable by curing a mineral binder composition as described above, comprising a mineral binder B, at least one free-radical initiator I, at least one catalyst C for the at least one free-radical initiator I, after mixing with water. The shaped body thus produced may have virtually any desired form and may for example be part of an edifice, such as of a building, of a masonry construction or of a bridge. According to embodiments, the shaped body is obtained by curing a mineral binder composition as described above at temperatures <15° C., preferably <5° C., especially <0° C.

A mineral binder composition of the present invention may be used to produce a shaped body as described above.

According to embodiments, a mineral binder composition of the present invention can be used for the jointing or grouting of porous materials, such as tiles, bricks, concrete, terracotta, plaster, or natural stones such as for example sandstone, limestone, granite or marble.

According to further embodiments, a mineral binder composition of the present invention can be used for cementing, for example cementing of walkways.

According to further embodiments, a mineral binder composition of the present invention can be used for levelling applications, especially for producing floor underlayments such as for example screeds.

According to further embodiments, a mineral binder composition of the present invention can be used for repairing of cementitious materials, especially of concrete.

According to further embodiments, a mineral binder composition of the present invention can be used as plaster and/or as render.

Preferred uses of a mineral binder composition of the present invention are at temperatures <15° C., more preferably <5° C., especially <0° C. However, it is likewise possible to use mineral binder compositions of the present invention at higher temperatures.

Preferably, any components of a mineral binder composition of the present invention and/or any additional mixing water are not tempered prior to mixing.

A typical use, especially the use for the jointing or grouting of porous materials, for cementing, for levelling applications, for repairing of cementitious materials, as plaster and/or as render, of a mineral binder composition of the present invention comprises the steps of a) preparation of the surface onto which the mineral binder composition is to be applied,
b) optionally application of a primer,
c) application of at least one layer of a mineral binder composition of the present invention,
d) optionally application of one or more additional layers of materials different from the mineral binder composition of the present invention.

A last aspect of the present invention relates to the use of a combination of at least one free-radical initiator I and at least one catalyst C for the at least one free-radical initiator I to accelerate the setting and/or curing of a mineral binder composition. The at least one free-radical initiator I and the at least one catalyst C are as described above.

Preferably, the use of a combination of at least one free-radical initiator I and at least one catalyst C for the at least one free-radical initiator I to accelerate the setting and/or curing of a mineral binder composition of the present invention is at temperatures <15° C., more preferably <5° C., especially <0° C. However, it is likewise possible to use a combination of at least one free-radical initiator I and at least one catalyst C for the at least one free-radical initiator I to accelerate the setting and/or curing of a mineral binder composition of the present invention at higher temperatures.

The mineral binder composition can be any composition comprising at least one mineral binder, preferably a mineral binder B as described above. The mineral binder composition optionally additionally comprises water, aggregates, and/or further additives as described above.

The following working examples illustrate the invention. The examples are not intended to limit the scope of the invention in any way.

WORKING EXAMPLES

Compressive strength was determined according to standard ASTM C-109 using 4×4×16 cm prisms. The prisms were hardened at 23° C. for 24 h.

Initial and final setting time was measured according to ASTM C403 at the temperature given in the below tables 2, 3, and 4 using a penetrometer.

The following table 1 gives an overview of the chemicals used.

TABLE 1

| Chemical | Origin | Comment |
|---|---|---|
| Sodium persulfate $Na_2S_2O_8$ | Sigma Aldrich | >98% purity |
| Triethanolamine (TEA)-85% | Huntsman | 85% TEA (99% purity) in water |
| Triethanolamine B85 | Huntsman | 85% TEA, 15% Diethanolamine (DEA) |

TABLE 1-continued

| Chemical | Origin | Comment |
|---|---|---|
| N-[2-(dimethylamino)ethyl]-N-methylethanolamine (DABCO-T) | Sigma Aldrich | 98% purity |
| A1: Calcium nitrate tetrahydrate | Sigma Aldrich | >99% purity |
| A2: Neopentylglycol | Sigma Aldrich | 99% purity |

Examples 1-4

33 g of Ordinary Portland Cement (Cemex Type I/II from Cemex Inc.), 6.5 g calcium aluminate cement from Kerneos Inc., 55 g sand (quartz sand 16-40 according to ASTM C778), 2 g anhydrite (Snow White Filler from US Gypsum Co), 0.3 g of Viscocrete powder (Polycarboxylate ether with 100% purity from Sika Corp.) were mixed in a Hobart mixer for 1 minute at 23° C. and 50% relative humidity to make a dry mix 1.

Dry mix 1 was then cooled to −5° C. At this temperature, sodium persulfate was added with 0.43 parts per 100 parts of the dry mix and mixed for 30 seconds. Then the catalyst C, water, and optionally further additives in amounts as given in below table 2 were added and mixing was continued at −5° C. for 2.5 minutes. Total mixing time at −5° C. was appr. 3 minutes.

TABLE 2

|  | C-1 | E-1 | E-2 | E-3 | E-4 |
|---|---|---|---|---|---|
| Dry mix 1 | 100 | 100 | 100 | 100 | 100 |
| I (Na$_2$S$_2$O$_8$) |  | 0.43 | 0.43 | 0.43 | 0.43 |
| C |  | 1.22[1] | 1.22[2] | 1.22[2] | 1.22[1] |
| Additives |  | 7 A1 | 7 A1 | 7 A1<br>0.08 A2 | 7 A1<br>0.08 A2 |
| Water | 11.5 | 7 | 7 | 7 | 7 |
| Results |  |  |  |  |  |
| T after mixing [° C.] | 5 | 21 | 26 | 25 | 21 |
| Initial set time* [min] | n.m. | 10 | 19 | 18 | 14 |
| Final set time* [min] | 155 | 25 | 26 | 28 | 29 |

*Measured at −10° C.
[1]Triethanolamine (TEA)-85%
[2]DABCO-T
n.m. not measured

Examples 1-4 show that a mineral binder composition according to the present invention shows significantly shorter initial and final setting time as compared to the same mineral binder composition but without free-radical initiator I and catalyst C added. TEA and DABCO-T are equally well suited as catalysts C at the same dosage in weight. The results in table 2 also show that mineral binder composition according to the present invention generate a considerable amount of heat upon mixing.

Examples E-5 and E-6

740 g of Ordinary Portland Cement (Cemex Type I/II from Cemex Inc.), 1000 g sand (Whibco P 35 from Whibco), 1 g of Viscocrete powder (Polycarboxylate ether with 100% purity from Sika Corp.) were mixed in a Hobart mixer for 1 minute at 23° C. and 50% relative humidity to make a dry mix 2.

Sodium persulfate was added with 0.43 parts per 100 parts of the dry mix 2 or 3 respectively and mixing was continued for 30 seconds at 23° C. Then the catalyst C, water, and optionally further additives in amounts as given in below table 3 were added and mixing was continued for 2.5 minutes. Total mixing time was appr. 3 minutes. Curing of the finished mixes was done at the temperatures as indicated in table 3.

TABLE 3

|  | C-2 | E-5 | E-6 |
|---|---|---|---|
| Dry mix 2 | 100 | 100 | 100 |
| I (Na$_2$S$_2$O$_8$) |  | 0.43 | 0.43 |
| C (TEA-85%) |  | 1.19 | 1.19 |
| Water | 17.7 | 17.62 | 17.62 |
| Results |  |  |  |
| Final setting time @ 23° C. [min] | 1440 | 40 | n.m. |
| Final setting time @ 4.5° C. [h] | 1440 | 120 | 120 |
| Final setting time @ 0° C. [h] | >1440 | 300 | n.m. | n.m. not measured

Examples 5 and 6 show that a mineral binder composition according to the present invention shows significantly shorter final setting time at various temperatures as compared to the same mineral binder composition but without free-radical initiator I and catalyst C added.

Examples 7-12

Dry mix 2 was prepared as described above and used with the initiator I and respective catalyst C as indicated in the following table 4.

TABLE 4

|  | C-2 | E-7 | E-8 | E-9 | E-10 | E-11 | E-12 |
|---|---|---|---|---|---|---|---|
| Dry mix 2 | 100 | 100 | 100 | 100 | 100 | 100 | 100 |
| I (Na$_2$S$_2$O$_8$) |  | 0.1 | 0.1 | 0.5 | 0.5 | 1.0 | 1.0 |
| C |  | 0.5[1] | 0.5[2] | 1.5[1] | 1.5[2] | 5.0[1] | 5.0[2] |
| Water | 17.7 | 17.7 | 17.7 | 17.7 | 17.7 | 17.7 | 17.7 |
| Results |  |  |  |  |  |  |  |
| T after mixing [° C.] | 12.5 | 17.1 | 18.5 | 19.2 | 20.3 | 28.1 | 30.0 |
| Initial set time* [min] | 590 | 427 | 475 | 138 | 120 | 53 | 33 |
| Final set time* [min] | 1440 | 530 | 536 | 169 | 153 | 160 | 134 |

*measured at 4° C.
[1]triethanolamine B85
[2]triethanolamine (TEA) - 85%

Examples 7-12 show that increasing the dosage of initiator I and catalyst C leads to higher heat evolution and subsequently to faster setting. The use of triethanolamine in a mixture with diethanolamine (85% triethanolamine, 15% diethanolamine) leads to essentially the same acceleration of setting as the use of aqueous triethanolamine (85% triethanolamine in water).

Example 13

200 g of Ordinary Portland Cement (Cemex Type I/II from Cemex Inc.), 625 g of calcium aluminate cement (Ciment Fondue from Kerneos), 2000 g of limestone (Vical 4005 from Minerals Technologies), 1400 g of ground limestone (Marble White 200 from Minerals Technologies), 290 g of gypsum cement (Hydrostone from USG), 70 g of re-dispersible powder (Vinnapas 5115 L), 7.5 g of Viscocrete powder (Polycarboxylate ether with 100% purity from Sika Corp.) were mixed in a Hobart mixer for 1 minute at 23° C. and 50% relative humidity to make a dry mix 3.

Sodium persulfate was added with 0.43 parts per 100 parts of the dry mix 3 and mixing was continued for 30 seconds at 23° C. Then the catalyst C, water, and optionally further additives in amounts as given in below table 5 were added and mixing was continued for 2.5 minutes. Total mixing time was appr. 3 minutes.

TABLE 5

|  | C-3 | E-13 |
|---|---|---|
| Dry mix 3 | 100 | 100 |
| I (Na$_2$S$_2$O$_8$) |  | 0.43 |
| C (TEA-85%) |  | 1.21 |
| Water | 21 | 19.78 |
| Results |  |  |
| Final setting time @ 23° C. [h] | 1 | 3 |
| Compressive strength after 24 h @ 23° C. [N] | 1365 | 2149 |

Example 13 shows that a mineral binder composition of the present invention may have a similar final setting time when measured at room temperature but develop a significantly increased compressive strength within the first 24 h of curing as compared to the same mineral binder composition but without free-radical initiator I and catalyst C added.

Examples 14-17

Examples 14-17 were prepared in the same way as examples 7-12 above but with varying dosages of initiator I and catalyst C. The following table 6 shows the respective dosages and measured results.

TABLE 6

|  | C-2 | E-14 | E-15 | E-16 | E-17 |
|---|---|---|---|---|---|
| Dry mix 2 | 100 | 100 | 100 | 100 | 100 |
| I (Na$_2$S$_2$O$_8$) |  | 0.1 | 0.1 | 0.2 | 0.2 |
| C |  | 3.69[1] | 7.37[1] | 1.47[1] | 2.95[1] |
| Water | 17.7 | 17.7 | 17.7 | 17.7 | 17.7 |
| Results |  |  |  |  |  |
| T after mixing [° C.] | 12.5 | 14 | 13 | 13.5 | 15 |
| Initial set time* [min] | 590 | 270 | 322 | 180 | 138 |
| Final set time* [min] | 1440 | 285 | 346 | 195 | 168 |

*measured at 4° C.
[1]triethanolamine (TEA)-85%

Examples 14-17 show that various molar ratios of initiator I to catalyst C lead to heat evolution and subsequently to faster setting. In particular molar ratios of initiator I to catalyst C of 1:10 (E-16), 1:20 (E-17), 1:50 (E-14), and 1:100 (E-15) lead to faster setting.

The invention claimed is:

1. A method comprising:
   applying a mineral binder composition to a substrate for jointing and/or grouting of porous materials, cementing, levelling, repairing cementitious materials, or as a render; and
   setting and/or curing the mineral binder composition, wherein the setting and/or curing of the mineral binder composition takes place at temperatures <15° C.,
   wherein the mineral binder composition comprises
   a) a mineral binder B,
   b) at least one free-radical initiator I,
   c) at least one catalyst C for the at least one free-radical initiator I,
   d) optionally aggregates,
   e) optionally additives selected from the group consisting of plasticizers, superplasticizers, rheology modifiers, accelerators, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, anti-freeze agents, and anti-microbial agents, and
   wherein the mineral binder composition comprises <5.0 w %, based on a total dry weight of the mineral binder composition, of radically polymerizable monomers or polyisocyanates.

2. The method of claim 1, wherein the mineral binder composition comprises
   a) 10-75 w % of the mineral binder B,
   b) 0.01-10.0 w % of the at least one free-radical initiator I,
   c) 0.05-10.0 w % of the at least one catalyst C for the at least one free-radical initiator I,
   d) 0-80 w % of the aggregates, and
   e) 0-10 w % of the additives selected from the group consisting of plasticizers, superplasticizers, rheology modifiers, accelerators, retarders, air-entrainers, de-aerating agents, corrosion inhibitors, fibers, synthetic organic polymers, expansion producing additives, pigments, strength enhancers, waterproofing additives, alkali-aggregate reaction inhibitors, chromate reducers, anti-freeze agents, and anti-microbial agents, each based on the total dry weight of the mineral binder composition.

3. The method of claim 1, wherein the at least one free-radical initiator I is selected from the group consisting of azo-compounds, persulfates, peroxodisulfates, salts of hydroxymethanesulfinic acid, hydroperoxides, peracetates, organic peroxides, azobis(isobutyronitrile), hydrogen peroxide, dibenzoylperoxide, and mixtures thereof.

4. The method of claim 1, wherein the at least one catalyst C for the at least one free-radical initiator I is selected from the group consisting of ascorbic acid, sodium formaldehyde sulfoxylates, organic sulfinic acid derivatives, organic sulfinic acid salts, toluidine derivatives, transition metal salts, transition metal complexes, inorganic sulfur bearing salts, reducing sugars, alkylaminoalkyl(meth)acrylamides, alkylaminoalkyl(meth)acrylates, secondary amines, tertiary amines, alkanolamines, ethoxylated alkanolamines, substituted anilines, substituted toluidines, substituted xylidines, substituted morpholines, diethanolamine (DEA), triethanolamine (TEA), N-butyldiethanolamine, 2-amino-2-methyl-1,3-propandiol, dimethylaminopropyl methacrylamide (DMAPMA), dimethylaminoethyl methacrylate (DMAEMA), 2-((2-(dimethylamino)ethyl)(methyl)amino)-1-ol, N-[2-(dimethylamino)ethyl]-N-methylethanolamine (DABCO-T), N,N,N',N'-tetrakis(2-hydroxyethyl)ethylenediamine (THEED), and mixtures thereof.

5. The method of claim 1, wherein the mineral binder B is selected from the group consisting of CEM I according to the standard EN 197-1, CEM II according to the standard EN 197-1, CEM III according to the standard EN 197-1, CEM IV according to the standard EN 197-1, CEM V according to the standard EN 197-1, calcium aluminate cements according to the standard EN 14647:2006-01, calcium sulfoaluminate cements, and mixtures thereof.

6. The method of claim 1, further comprising water in an amount of 10-100 w % in relation to the content of the mineral binder B.

7. The method of claim 1, wherein
0.05-5.0 w % of the at least one free-radical initiator I, and 0.1-7.5 w % of the at least one catalyst C for the at least one free-radical initiator I, is comprised in the mineral binder composition, each based on the total dry weight of the mineral binder composition.

8. The method of claim 1, wherein
0.1-2.5 w % of the at least one free-radical initiator I, and 0.25-5.0 w % of the at least one catalyst C for the at least one free-radical initiator I, is comprised in the mineral binder composition, each based on the total dry weight of the mineral binder composition.

9. The method of claim 1, wherein
0.2-1.0 w % of the at least one free-radical initiator I, and 0.5-3.5 w % of the at least one catalyst C for the at least one free-radical initiator I, is comprised in the mineral binder composition, each based on the total dry weight of the mineral binder composition.

10. The method of claim 1, wherein the setting and/or curing of the mineral binder composition takes place at temperatures <5° C.

11. The method of claim 1, wherein the setting and/or curing of the mineral binder composition takes place at temperatures <0° C.

12. A multi-component composition consisting of
a) a first component K1 comprising
  1) 10-75 w % of a mineral binder B, and
  2) 0.01-10.0 w % of the at least one free-radical initiator I,
b) a second component K2 comprising
  1) 0.05-10.0 w % of the at least one catalyst C for the at least one free-radical initiator I, and
  2) water,
each based on a total weight of the multi-component composition and wherein the multi-component composition comprises <5.0 w %, based on a total dry weight of the multi-component composition, of radically polymerizable monomers or polyisocyanates.

* * * * *